US012634142B2

(12) United States Patent
Tsuchida

(10) Patent No.: US 12,634,142 B2
(45) Date of Patent: May 19, 2026

(54) SECURE COMPUTATION SYSTEM, SECURE COMPUTATION SERVER APPARATUS, SECURE COMPUTATION METHOD, AND SECURE COMPUTATION PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 342 days.

(21) Appl. No.: 18/030,219

(22) PCT Filed: Oct. 6, 2020

(86) PCT No.: PCT/JP2020/037870
§ 371 (c)(1),
(2) Date: Apr. 4, 2023

(87) PCT Pub. No.: WO2022/074735
PCT Pub. Date: Apr. 14, 2022

(65) Prior Publication Data
US 2023/0344638 A1 Oct. 26, 2023

(51) Int. Cl.
| | |
|---|---|
| *H04L 9/40* | (2022.01) |
| *G06F 7/76* | (2006.01) |
| *H04L 9/08* | (2006.01) |
| *H04L 9/32* | (2006.01) |

(52) U.S. Cl.
CPC ............ *H04L 9/3236* (2013.01); *G06F 7/764* (2013.01); *H04L 9/0869* (2013.01)

(58) Field of Classification Search
CPC ..... H04L 9/3236; H04L 9/0869; H04L 9/085; H04L 2209/46; G06F 7/64; G09C 1/00
See application file for complete search history.

(56) References Cited

U.S. PATENT DOCUMENTS

| | | | | |
|---|---|---|---|---|
| 9,514,326 | B1 * | 12/2016 | Kroeger | G06F 16/113 |
| 11,115,197 | B1 * | 9/2021 | Griffin | H04L 9/14 |
| 2014/0075190 | A1 | 3/2014 | Nagai et al. | |
| 2015/0278547 | A1 | 10/2015 | Kawamoto et al. | |
| 2017/0026146 | A1 * | 1/2017 | Tollefson | H04K 3/825 |
| 2018/0115415 | A1 | 4/2018 | Teranishi | |

(Continued)

FOREIGN PATENT DOCUMENTS

| | | |
|---|---|---|
| JP | 2005-346659 A | 12/2005 |
| JP | 2012-227901 A | 11/2012 |
| JP | 2015-135381 A | 7/2015 |

(Continued)

OTHER PUBLICATIONS

International Search Report for PCT Application No. PCT/JP2020/037870, mailed on Dec. 22, 2020.

(Continued)

*Primary Examiner* — Thaddeus J Plecha

(57) ABSTRACT

A secure computation system comprises at least five secure computation server apparatuses connected to each other via a network and performs secure computation on a value stored while being secret-shared, and each of the secure computation server apparatuses has a comparative verification part that compares values, which should be the same, received from at least three secure computation server apparatuses and that accepts a received value identical to at least another received value as a correct value.

12 Claims, 6 Drawing Sheets

(56) References Cited

U.S. PATENT DOCUMENTS

2023/0361993 A1* 11/2023 Camenisch ........... H04L 9/0825

FOREIGN PATENT DOCUMENTS

| | | | |
|---|---|---|---|
| JP | 2015-194959 | A | 11/2015 |
| WO | 2016/159357 | A1 | 10/2016 |

OTHER PUBLICATIONS

Byali, M., Chaudhari, H., A., & Suresh, A., "FLASH: Fast and Robust Framework for Privacy-preserving Machine Learning", Proceedings on Privacy Enhancing Technologies, 2020 (2): 459-480.

Matsumoto, Kazuma et al., "A Collusion-resilient Hybrid P2P Framework for Massively Multiplayer Online Games", (DICOMO 2017) Symposium Essays, Information Processing Society of Japan Symposium Series, Jun. 21, 2017, vol. 2017, No. 1, pp. 340-346.

Chida, Koji et al., "A Three-Party Secure Function Evaluation with Lightweight Verifiability Revisited", Computer Security Symposium 2021 Essays, Information Processing Society of Japan Symposium Series. Oct. 12, 2010, vol. 2010, No. 9, pp. 555-560.

* cited by examiner

SECURE COMPUTATION SYSTEM, SECURE COMPUTATION SERVER APPARATUS, SECURE COMPUTATION METHOD, AND SECURE COMPUTATION PROGRAM

This application is a National Stage Entry of PCT/JP2020/037870 filed on Oct. 6, 2020, the contents of all of which are incorporated herein by reference, in their entirety.

FIELD

The present invention relates to a secure computation system, secure computation server apparatus, secure computation method, and secure computation program.

BACKGROUND

In recent years, the research and development of a technology called secure computation have been active. Secure computation is a technique that executes a predetermined process while keeping the computation process and the results thereof secret from a third party. Multi-party computation is one of the representative techniques of secure computation. In multi-party computation, confidential data is distributed to a plurality of servers (secure computation server apparatuses), and arbitrary computations are executed on the data while secrecy is maintained. Further, the data distributed to each secure computation server apparatus is called a "share." Hereinafter, the term "secure computation" as used herein refers to multi-party computation, unless otherwise specified.

Even among the techniques generally called secure computations, there are different levels of security achieved. For instance, let's assume that an adversary is among the participants of a multi-party group that performs secure computation. In this case, between a secure computation technique that can detect the presence of the adversary and interrupt the process, and one that can obtain the correct computation results without interrupting the process despite the presence of the adversary, the latter is more secure than the former. Further, secure computation that satisfies the security of the latter is called Guaranteed Output Delivery (GOD), and an example of secure computation that achieves this is known (for instance, refer to Non-Patent Literature 1).

Non-Patent Literature 1

Byali, M., Chaudhari, H., Patra, A., & Suresh, A. (2020). "FLASH: Fast and Robust Framework for Privacy-preserving Machine Learning," Proceedings on Privacy Enhancing Technologies, 2020 (2): 459-480.

SUMMARY

The disclosure of each literature in Citation List above is incorporated herein in its entirety by reference thereto. The following analysis is given by the present inventors.

In evaluating the security of secure computation, not only the achievable security effects but also premises are important. A typical premise is provided by the random oracle model or random oracle hypothesis for a hash function.

A hash function returns a unique output for an input, but is configured so that it is difficult to infer the input from the output. Here, being difficult to do so does not guarantee that it is absolutely impossible. Therefore, security is evaluated on the premise that the hash function used has no vulnerability. The security provided by this premise is described as "being secure in the random oracle model" or "being secure under the random oracle hypothesis." The secure computation described in Non-Patent Literature 1 is "secure in the random oracle model."

Meanwhile, the opposite of "being secure in the random oracle model" is "being secure in the standard model." In other words, even if the input can be inferred from the output of a hash function, this itself does not become a vulnerability of the secure computation scheme. It goes without saying that, with the same level of achievable security, being secure in the standard model is able to achieve a higher level of security than being secure in the random oracle model.

In view of the problem above, it is an object of the present invention to provide a secure computation system, secure computation server apparatus, secure computation method, and secure computation program that contribute to improving delivered security.

According to a first aspect of the present invention, there is provided a secure computation system comprising at least five secure computation server apparatuses connected to each other via a network and performing secure computation on a value stored while being secret-shared, wherein each of the secure computation server apparatuses comprises a comparative verification part that compares values, which should be the same, received from at least three secure computation server apparatuses and that accepts a received value identical to at least another received value as a correct value.

According to a second aspect of the present invention, there is provided a secure computation server apparatus out of at least five secure computation server apparatuses, connected to each other via a network, for performing secure computation on a value stored while being secret-shared, the secure computation server apparatus comprising a comparative verification part that compares values, which should be the same, received from at least three secure computation server apparatuses and accepts a received value identical to at least another received value as a correct value.

According to a third aspect of the present invention, there is provided a secure computation method comprising at least five secure computation server apparatuses connected to each other via a network and performing secure computation on a value stored while being secret-shared, wherein each of the secure computation server apparatuses compares values, which should be the same, received from at least three secure computation server apparatuses and that accepts a received value identical to at least another received value as a correct value.

According to a fourth aspect of the present invention, there is provided a secure computation program causing at least five secure computation server apparatuses connected to each other via a network to perform secure computation on a value stored while being secret-shared, the secure computation program including a process of comparing values, which should be the same, received from at least three secure computation server apparatuses and accepting a received value identical to at least another received value as a correct value. Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, it becomes possible to provide a secure computation system, secure computation server apparatus, secure computation method, and secure computation program that contribute to improving security.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
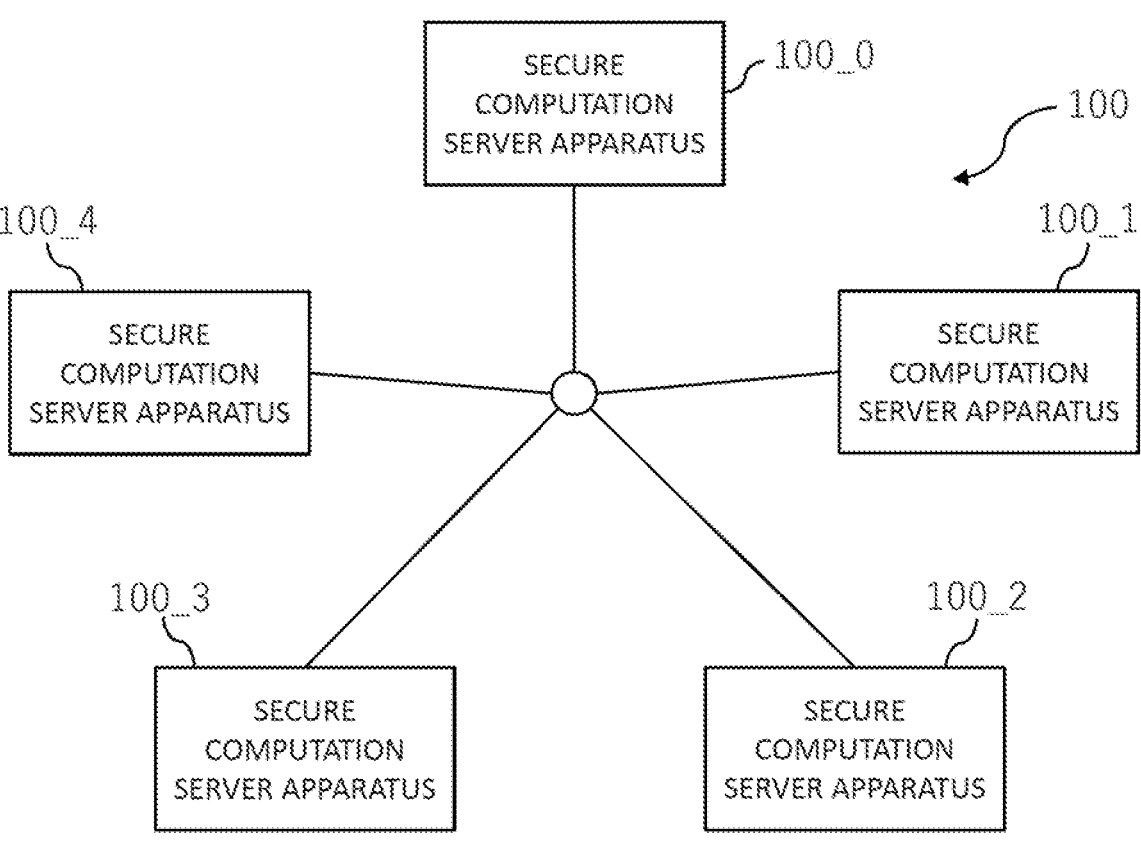
FIG. 1 is a block diagram showing an example of the functional configuration of a secure computation system according to a first example embodiment.
Figure 2:
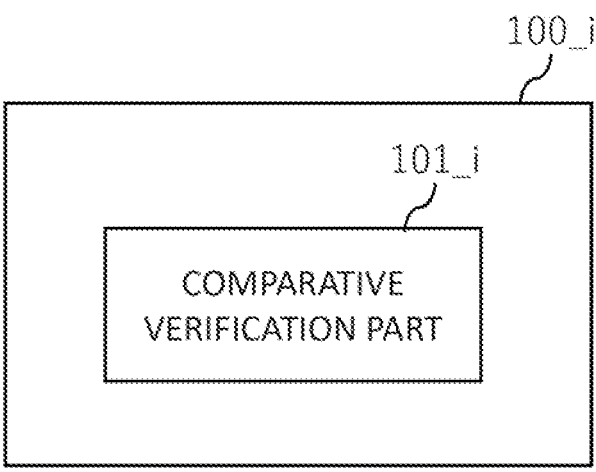
FIG. 2 is a block diagram showing an example of the functional configuration of a secure computation server apparatus according to the first example embodiment.

The following describes a secure computation system and secure computation server apparatus relating to a first example embodiment with reference to FIGS. 1 and 2. In the first example embodiment, only the basic concept of the present invention is described.

FIG. 1 is a block diagram showing an example of the functional configuration of the secure computation system according to the first example embodiment. As shown in FIG. 1, the secure computation system 100 according to the first example embodiment comprises a first secure computation server apparatus 100_0, a second secure computation server apparatus 100_1, a third secure computation server apparatus 100_2, a fourth secure computation server apparatus 100_3, and a fifth secure computation server apparatus 100_4. The first, the second, the third, the fourth, and the fifth secure computation server apparatuses 100_0, 100_1, 100_2, 100_3, and 100_4 are connected to each other via a network so as to be able to communicate with each other. A circle in the center of FIG. 1 indicates the network.

The secure computation system 100 comprising the first to the fifth secure computation server apparatuses 100_i (i=0, 1, 2, 3, 4) is able to compute desired shares of a value supplied by any one of the first to the fifth secure computation server apparatuses 100_i (i=0, 1, 2, 3, 4) as an input while keeping the input value and the values during the computation process secret, and distribute the computation results to the first to the fifth secure computation server apparatuses 100_i (i=0, 1, 2, 3, 4) to store them therein.

Further, the secure computation system 100 comprising the first to the fifth secure computation server apparatuses 100_i (i=0, 1, 2, 3, 4) is able to compute desired shares of shares distributed to and stored in the first to the fifth secure computation server apparatuses 100_i (i=0, 1, 2, 3, 4) while keeping the values during the computation process secret, and distribute the computation results to the first to the fifth secure computation server apparatuses 100_i (i=0, 1, 2, 3, 4) to store them therein.

Further, the shares that resulted from the computations above may be reconstructed by exchanging the shares with the first to the fifth secure computation server apparatuses 100_0 to 100_4. Alternatively, the shares may be reconstructed by transmitting them to an external apparatus, instead of the first to the fifth secure computation server apparatuses 100_0 to 100_4.

Further, the secure computation system 100 comprising the first to the fifth secure computation server apparatuses 100_i (i=0, 1, 2, 3, 4) is able to continue correct secure computation without interrupting the process even when one of the first to the fifth secure computation server apparatuses 100_i (i=0, 1, 2, 3, 4) is operated by an adversary.

For instance, the following share configuration may be employed so that correct secure computation can be continued without interrupting the process even when one of the first to the fifth secure computation server apparatuses 100_i (i=0, 1, 2, 3, 4) is operated by an adversary.

Shares of a residue class ring $Z_n$ of order n for each party $P_i$ (i=0, 1, 2, 3, 4) are defined as follows.

The shares over the residue class ring $Z_n$ of an element $x \in Z_n$ of the residue class ring $Z_n$ of order n are expressed as below. Further, m is an integer of 2 or more and $n=2^m$. In other words, a residue class ring $Z_2$ of order 2 is distinguished from the residue class ring $Z_n$ of order n.

$$[x] = ([x]_0, [x]_1, [x]_2, [x]_3, [x]_4)$$

Decompose the element $x \in Z_n$ of the residue class ring $Z_n$ of order n to satisfy the relationship with:

$$x = x_0 + x_1 + x_2 + x_3 + x_4 \bmod n,$$

and define $[x]_i$ distributed to and held by each party $P_i$ (i=0, 1, 2, 3, 4) as follows:

$$[x]_i = (x_i, x_{i+1}, x_{i+2}, x_{i+3}), \text{ where } x_{4+1} = x_0$$

Meanwhile, shares over the residue class ring $Z_2$ of an element $x \in Z_2$ of the residue class ring $Z_2$ of order 2 are defined in the same manner as shares over the residue class ring $Z_n$ when n=2, however, they are notated differently from the residue class ring $Z_n$ of order n and expressed as $[x]^B$.

When the shares $[x]_0$, $[x]_1$, $[x]_2$, $[x]_3$, $[x]_4$ held by each party $P_i$ (i=0, 1, 2, 3, 4) are defined as above, each party $P_i$ (i=0, 1, 2, 3, 4) cannot reconstruct x from one of the shares $[x]_0$, $[x]_1$, $[x]_2$, $[x]_3$, $[x]_4$ that he/she holds. There is a secret sharing scheme in which x can be reconstructed by combining the shares held by at least two of the parties $P_i$ (i=0, 1, 2, 3, 4). This secret sharing scheme is called a 2-out-of-5 additive secret sharing scheme.

In this secret sharing scheme, in addition to when reconstructing x, when performing secure computation, a party $P_i$ needs to receive from another party $P_j$ a share value $x_{i+4}$ that $P_i$ does not have. At this time, since all the other parties $P_j$ should have the share value $x_{i+4}$ that the party $P_i$ does not have, the party $P_i$ should essentially be able to receive the share value $x_{i+4}$, which $P_i$ does not have, from any one of the other parties $P_j$. If, however, there is an adversary among the other parties $P_j$, he/she may transmit the wrong value, instead of the value $x_{i+4}$ that $P_i$ should receive. Then, $P_i$ may end up performing secure computation based on the wrong value, obtaining the wrong computation, or may not be able to execute the computation itself normally in the first place.

Therefore, in the present example embodiment, each secure computation server apparatus 100_i comprises a comparative verification part 101_$i$, as shown in FIG. 2, and compares values, which should be the same, received from at least three other secure computation server apparatuses. When at least two other secure computation server apparatuses send the same value, the secure computation server apparatus 100_$i$ accepts this value as a correct value. As a result, correct computation results can be obtained without interrupting the process even if there is an adversary among the parties.

More specifically, the following process example is conceivable. Here, let us imagine a situation in which, when reconstructing x, a party $P_i$ receives from another party $P_j$ a share value $x_{i+4}$, which $P_i$ does not have. Further, each party $P_i$ (i=0, 1, 2, 3, 4) operates each secure computation server apparatus 100_$i$ (i=0, 1, 2, 3, 4), but actual processing is executed by each secure computation server apparatus 100_$i$ (i=0, 1, 2, 3, 4), not each party $P_i$ (i=0, 1, 2, 3, 4).

Reconstructing x requires all the values $x_0$, $x_1$, $x_2$, $x_3$, $x_4$ due to the relational expression $x=x_0+x_1+x_2+x_3+x_4$ mod n. However, since the share held by a party $P_i$ is $[x]_i=(x_i, x_{i+1}, x_{i+2}, x_{i+3})$ (where $x_{4+1}=x_0$), $P_i$ does not have $x_{i+4}$. Therefore, the party $P_i$ needs to receive $x_{i+4}$ from another party $P_j$.

Meanwhile, because of the way the shares are defined, all the other parties $P_j$ hold $x_{i+4}$. Therefore, all $P_i$ needs to do is receive $x_{i+4}$ from one of the other parties $P_j$, but here, $P_i$ receives supposedly same $x_{i+4}$ from at least three other parties $P_j$. Further, with the assumption that $x_{i+4}$ is received from three other parties $P_j$, the values received from each of the three parties are notated as $x_{i+4, 1}$, $x_{i+4, 2}$, $x_{i+4, 3}$ in order to distinguish them.

Then, the party $P_i$ compares the received values $x_{i+4, 1}$, $x_{i+4, 2}$, $x_{i+4, 3}$, which should be the same. When at least two of the received values are identical, the party $P_i$ accepts this value as the correct value $x_{i+4}$.

For instance, if $x_{i+4, 1}=x_{i+4, 2}$ or $x_{i+4, 1}=x_{i+4, 3}$, then $P_i$ takes $x_{i+4, 1}$ as the correct value $x_{i+4}$ ($x_{i+4}=x_{i+4, 1}$). Further, if $x_{i+4, 2}=x_{i+4, 3}$, then $P_i$ takes $x_{i+4, 2}$ as the correct value $x_{i+4}$ ($x_{i+4}=x_{i+4, 2}$). As described, when at least two of the received values are the same, by accepting this value as the correct value, even if one of the received values $x_{i+4, 1}$, $x_{i+4, 2}$, $x_{i+4, 3}$ is false, the correct value can be determined. Then, by calculating $x=x_0+x_1+x_2+x_3+x_4$ mod n using the correct value $x_{i+4}$, x can be reconstructed.

As described, even if there is an adversary among the other parties $P_j$, the correct value can be determined by receiving the supposedly same $x_{i+4}$ from at least three other parties $P_j$ and accepting a value sent by at least two parties as the correct value. In other words, even if there is an adversary, the correct computation can be obtained without interrupting the process, thereby achieving Guaranteed Output Delivery (GOD). Further, in the above process, since no hash function is used in the first place, Guaranteed Output Delivery (GOD) is achieved in the standard model.

In the first example embodiment described above, only the basic concept of the present invention was discussed. Therefore, in order to apply the present invention to a practical example embodiment, it is necessary to apply the concept described above to a series of processes including addition and multiplication. In the following second example embodiment, the concept described above is applied to a practical example embodiment.

Second Example Embodiment

Figure 3:
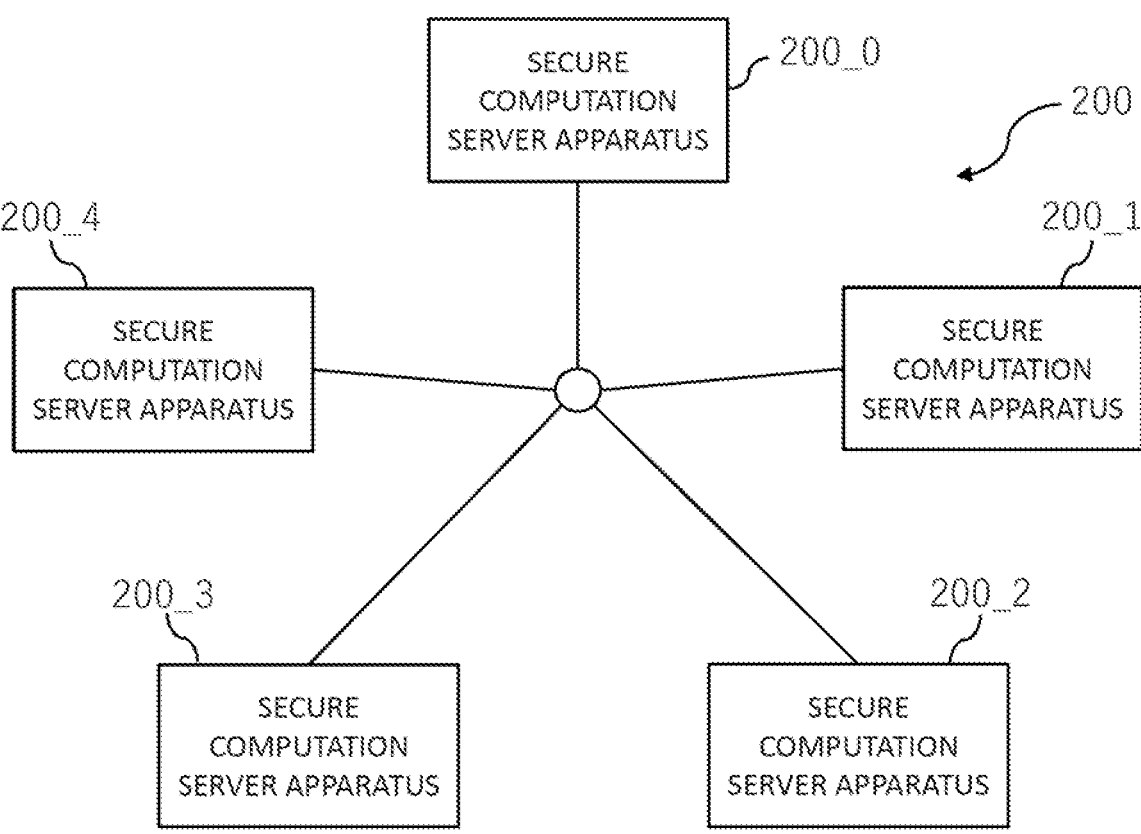
FIG. 3 is a block diagram showing an example of the functional configuration of a secure computation system according to a second example embodiment.
Figure 4:
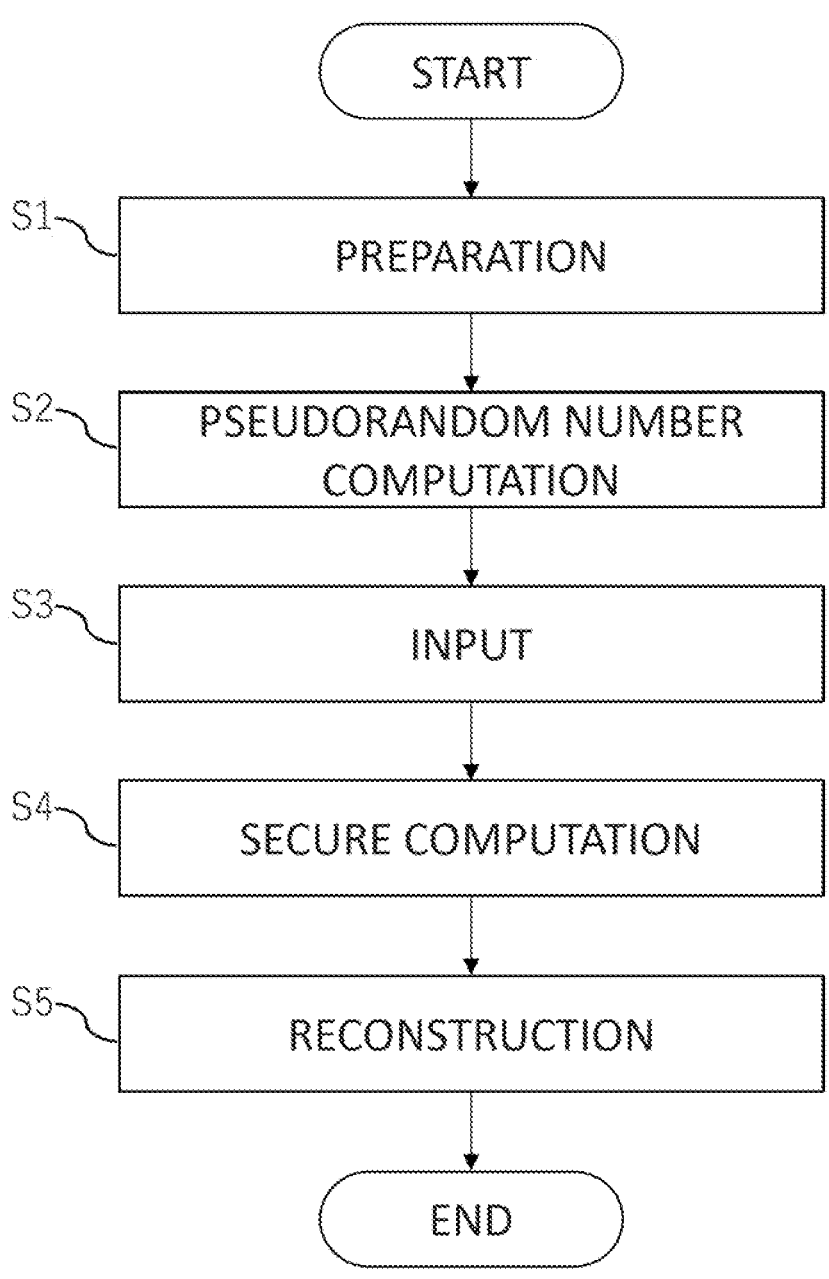
FIG. 4 is a flowchart showing an outline of the procedure of a secure computation method.

The following describes a secure computation system and secure computation server apparatus relating to the second example embodiment with reference to FIGS. 3 and 4.

FIG. 3 is a block diagram showing an example of the functional configuration of the secure computation system according to the second example embodiment. As shown in FIG. 3, the secure computation system 200 according to the second example embodiment comprises a first secure computation server apparatus 200_0, a second secure computation server apparatus 200_1, a third secure computation server apparatus 200_2, a fourth secure computation server apparatus 200_3, and a fifth secure computation server apparatus 200_4. The first, the second, the third, the fourth, and the fifth secure computation server apparatuses 200_0, 200_1, 200_2, 200_3, and 200_4 are connected to each other via a network so as to be able to communicate with each other.

The secure computation system 200 comprising the first to the fifth secure computation server apparatuses 200_$i$ (i=0, 1, 2, 3, 4) is able to compute desired shares of a value supplied by any one of the first to the fifth secure computation server apparatuses 200_$i$ (i=0, 1, 2, 3, 4) as an input while keeping the input value and the values during the computation process secret, and distribute the computation results to the first to the fifth secure computation server apparatuses 200_$i$ (i=0, 1, 2, 3, 4) to store them therein.

Further, the secure computation system 200 comprising the first to the fifth secure computation server apparatuses 200_$i$ (i=0, 1, 2, 3, 4) is able to continue correct secure computation without interrupting the process even when one of the first to the fifth secure computation server apparatuses 200_$i$ (i=0, 1, 2, 3, 4) is operated by an adversary.

FIG. 4 is a flowchart showing an outline of the procedure of a secure computation method. The procedure of the secure computation method shown in FIG. 4 is merely a typical example of a secure computation procedure for facilitating the description, and in an actual secure computation method, it is normal to make changes such as executing only some steps, executing the steps in a different order, or repeating some steps.

As shown in FIG. 4, a typical secure computation procedure includes a preparation step (step S1), a pseudorandom number computation step (step S2), an input step (step S3), a secure computation step (step S4), and a reconstruction step (step S5).

For instance, the preparation step (the step S1) includes a process for having each secure computation server apparatus 200_$i$ (i=0, 1, 2, 3, 4) appropriately share seeds for generating pseudorandom numbers. The pseudorandom number computation step (the step S2) includes a process of deterministically generating pseudorandom numbers using the seeds shared by each secure computation server apparatus 200_$i$ (i=0, 1, 2, 3, 4) in the preparation step (the step S1) and an identifier. Further, the generated pseudorandom numbers are used for masking in the secure computation step (the step S4).

The input step (the step S3) is a step for distributing inputs, to be securely computed, to each secure computation server apparatus 200_$i$ (i=0, 1, 2, 3, 4) and storing them therein. The secure computation step (the step S4) is a step of performing desired computation on the shares distributed to and stored in each secure computation server apparatus 200_$i$ (i=0, 1, 2, 3, 4) while maintaining secrecy. Any computation can be performed in the secure computation step (the step S4), but multiplication is particularly important. The results of the secure computation step (the step S4) are generally shares, which are distributed to and stored in each secure computation server apparatus 200_$i$ (i=0, 1, 2, 3, 4). The reconstruction step (the step S5) is a step of reconstructing the shares resulting from the secure computation step (the step S4).

The following describes the process details for each step.

[Preparation (Seed Sharing)]

Figure 5:
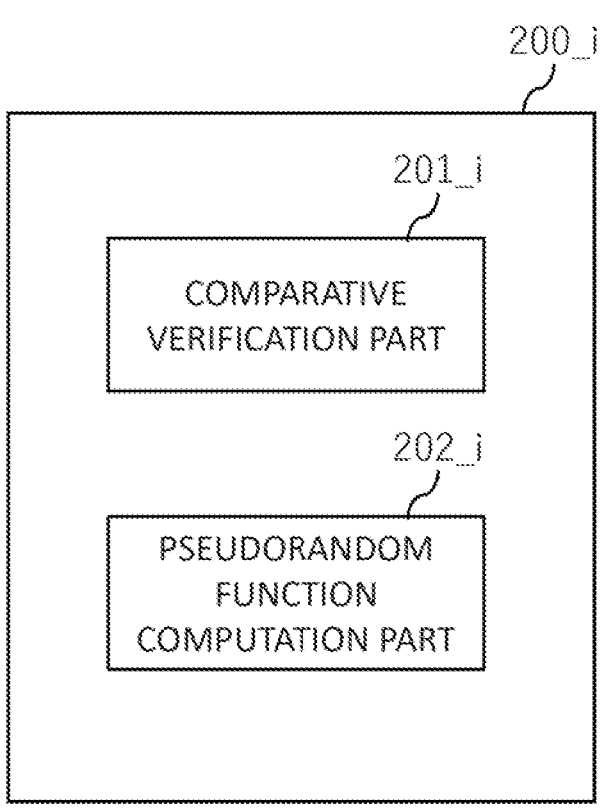
FIG. 5 is a block diagram showing an example of the functional configuration of a secure computation server apparatus according to the second example embodiment.

The seeds generated in the preparation step (the step S1) are for having pseudorandom functions $F_n$, $F_2$ to deterministically generate pseudorandom numbers. The secure computation server apparatuses $200\_i$ (i=0, 1, 2, 3, 4) appropriately share the seeds for generating pseudorandom numbers so that the secure computation server apparatuses $200\_i$ (i=0, 1, 2, 3, 4) can generate pseudorandom numbers appropriately associated with each other. The seeds shared by the secure computation server apparatuses $200\_i$ (i=0, 1, 2, 3, 4) may be configured and given to each secure computation server apparatus $200\_i$ (i=0, 1, 2, 3, 4) by a trusted third party as an initial setting, however, the following describes a procedure for having the secure computation server apparatuses $200\_i$ (i=0, 1, 2, 3, 4) share the seeds while subsequently maintaining secrecy. When the secure computation server apparatuses $200\_i$ (i=0, 1, 2, 3, 4) cooperate with each other to share the seeds, for instance, the secure computation server apparatus $200\_i$ comprises a comparative verification part $201\_i$ as shown in FIG. 5, and Guaranteed Output Delivery (GOD) in the standard model is achieved by having the comparative verification part $201\_i$ choose the correct value. Further, it is possible to realize the comparative verification part $201\_i$ as a program executed in a hardware configuration described later.

The relationship between the pseudorandom functions $F_n$, $F_2$, the seeds and the identifier is as follows. The pseudorandom functions $F_n$, $F_2$ are binary operations defined for a security parameter $\kappa$.

$$F_n: \{0,1\}^{\kappa} \times \{0,1\}^{\kappa} \rightarrow \{0,1\}^n$$

$$F_2: \{0,1\}^{\kappa} \times \{0,1\}^{\kappa} \rightarrow \{0,1\}^2$$

Meanwhile, $\text{seed}_i \in \{0, 1\}^{\kappa}$ (i=0, 1, 2, 3, 4) are values appropriately shared by the secure computation server apparatuses $200\_i$ (i=0, 1, 2, 3, 4), and the identifier vid $\in \{0, 1\}^{\kappa}$ is a public value such as a counter. The pseudorandom functions $F_n$, $F_2$ receive these seeds and the identifier as inputs and deterministically generate pseudorandom numbers.

Of five seeds ($\text{seed}_i \in \{0, 1\}^{\kappa}$ (i=0, 1, 2, 3, 4)), each secure computation server apparatus $200\_i$ holds ($\text{seed}_i$, $\text{seed}_{i+1}$, $\text{seed}_{i+2}$, $\text{seed}_{i+3}$), where $\text{seed}_{4+1} = \text{seed}_0$. In other words, each secure computation server apparatus $200\_i$ does not hold every $\text{seed}_i$; the only seed each secure computation server apparatus $200\_i$ does not have is $\text{seed}_{i+4}$.

In order for the secure computation server apparatuses $200\_i$ to share the seeds as described above, information must be exchanged among them. Then, if there is any secure computation server apparatus $200\_i$ operated by an adversary, the seeds cannot be appropriately shared. Therefore, in the preparation step (the step S1) of the present example embodiment, the seeds are shared as follows.

The following describes an example of generating a $\text{seed}_i$. The $\text{seed}_i$ should be held by the four parties $P_i$, $P_{i+1}$, $P_{i+2}$, $P_{i+3}$, who therefore cooperate with each other to generate the $\text{seed}_i$.

Initially, each party $P_i$, $P_{i+1}$, $P_{i+2}$, $P_{i+3}$ randomly generates $s_i^{(i)}$, $s_i^{(i+1)}$, $s_i^{(i+2)}$, $s_i^{(i+3)} \in \{0, 1\}^{\kappa}$.

Then, the party $P_i$ sends $s_i^{(i)}$ to the other parties $P_{i+1}$, $P_{i+2}$, $P_{i+3}$. Meanwhile, the parties $P_{i+1}$, $P_{i+2}$, $P_{i+3}$ exchange the received $s_i^{(i)}$ with each other. The parties $P_{i+1}$, $P_{i+2}$, $P_{i+3}$ make the following judgments on $s_i^{(i)}$ exchanged with each other.

(1) When $s_i^{(i)}$ obtained from the other two parties match, $P_{i+1}$, $P_{i+2}$, $P_{i+3}$ deem $s_i^{(i)}$ obtained from the other two to be correct and send an "accept" message to the other two parties.

(2) When $s_i^{(i)}$ obtained from the other two parties do not match, but either of them matches their own $s_i^{(i)}$, $P_{i+1}$, $P_{i+2}$, $P_{i+3}$ deem their own $s_i^{(i)}$ to be correct. They then send a "revise" message along with their own $s_i^{(i)}$ to the party who sent the unmatched $s_i^{(i)}$ and send an "accept" message to the party who sent the matched $s_i^{(i)}$.

(3) When $s_i^{(i)}$ obtained from the other two parties do not match and they do not match their own $s_i^{(i)}$ either, $P_{i+1}$, $P_{i+2}$, $P_{i+3}$ send a (corrupted, $P_i$) message to the other two parties.

When $P_{i+1}$, $P_{i+2}$, $P_{i+3}$ receive "accept" messages from the other two, they continue to the next step, and when they receive a "revise" message, they accept $s_i^{(i)}$ sent along with the message as the correct one and continue to the next step. Meanwhile, if they receive a (corrupted, $P_i$) message, they exclude $P_i$ and perform semi-honest secure four-party computation since $P_i$ is an adversary.

The procedure described above is also performed on the parties $P_{i+1}$, $P_{i+2}$, $P_{i+3}$ so that the parties $P_i$, $P_{i+1}$, $P_{i+2}$, $P_{i+3}$ share the correct values of $s_i^{(i)}$, $s_i^{(i+1)}$, $s_i^{(i+2)}$, $s_i^{(i+3)} \in \{0, 1\}^{\kappa}$. Then, the $\text{seed}_i$ is generated from the shared $s_i^{(i)}$, $s_i^{(i+1)}$, $s_i^{(i+2)}$, $s_i^{(i+3)}$ as follows:

$$\text{seed}_i = s_i^{(i)} \oplus s_i^{(i+1)} \oplus s_i^{(i+2)} \oplus s_i^{(i+3)} \qquad \text{[Math. 1]}$$

By performing the procedure described above for the five seeds ($\text{seed}_i \in \{0, 1\}^{\kappa}$ (i=0, 1, 2, 3, 4)), each secure computation server apparatus $200\_i$ is able to correctly hold ($\text{seed}_i$, $\text{seed}_{i+1}$, $\text{seed}_{i+2}$, $\text{seed}_{i+3}$).

In the seed sharing method described above, by receiving the supposedly same $s_i^{(i)}$ from at least three other parties $P_j$ and accepting a value sent by at least two parties as the correct value, even if there is an adversary among the other parties $P_j$, the correct value can be determined. In other words, the correct computation can be obtained without interrupting the process even if there is an adversary, thereby achieving Guaranteed Output Delivery (GOD). Further, in the above process, since no hash function is used in the first place, Guaranteed Output Delivery (GOD) is achieved in the standard model.

[Pseudorandom Number Computation (Mask Generation)]

The pseudorandom number computation step (the step S2) deterministically generates pseudorandom numbers using the seeds generated in the preparation step (the step S1) and the identifier. The pseudorandom numbers generated in the pseudorandom number computation step (the step S2) are used to mask values to be sent in secure computation later. For this purpose, pseudorandom numbers that follow the rules described below (correlated randomness) are generated. For instance, in order to generate pseudorandom numbers following the rules described below, each secure computation server apparatus $200\_i$ may comprise a pseudorandom function computation part $202\_i$, as shown in FIG. 5, and each pseudorandom function computation part $202\_i$ may generate pseudorandom numbers following the rules described below. Further, it is possible to realize the pseudorandom function computation part $202\_i$ as the program executed in the hardware configuration described later.

Here, let us look at a case where the parties $P_i$, $P_{i+1}$, $P_{i+2}$, $P_{i+3}$ cooperate and create correlated randomness that appears random to the party $P_{i+4}$ and cannot be removed by him/her, but that can be deterministically computed by the remaining parties $P_i$, $P_{i+1}$, $P_{i+2}$, $P_{i+3}$. In order to achieve this, because the party $P_{i+4}$ does not have $seed_{i+3}$, the pseudorandom number below satisfies these conditions when $seed_{i+3}$ is used as an input of the pseudorandom function $F_n$.

$$\alpha_k = F_n(vid_k, seed_{i+3}) - F_n(vid_{k+1}, seed_{i+3}) \bmod n$$

Further, it is possible to generate five ak by varying the index k of the identifier $vid_k$ from k=0 to k=4. Therefore, a set of $\alpha_k$ is defined as shown below. It can be easily verified that $\alpha_0$, $\alpha_1$, $\alpha_2$, $\alpha_3$, $\alpha_4$ defined as below satisfy $\alpha_0 + \alpha_1 + \alpha_2 + \alpha_3 + \alpha_4 = 0$.

$$(\alpha_0, \alpha_1, \alpha_2, \alpha_3, \alpha_4) = CR(i+4, \{vid_k\}^4_{k=0}, seed_{i+3})$$

The pseudorandom numbers $\alpha_0$, $\alpha_1$, $\alpha_2$, $\alpha_3$, $\alpha_4$ generated in this way look like random numbers to the party $P_{i+4}$ and cannot be removed by him/her, but the remaining parties $P_i$, $P_{i+1}$, $P_{i+2}$, $P_{i+3}$ can compute them deterministically. Meanwhile, although the party $P_{i+4}$ cannot remove each of the pseudorandom numbers $\alpha_0$, $\alpha_1$, $\alpha_2$, $\alpha_3$, $\alpha_4$, when he/she has all the pseudorandom numbers $\alpha_0$, $\alpha_1$, $\alpha_2$, $\alpha_3$, $\alpha_4$, the sum thereof is zero and can be removed.

Further, the pseudorandom number generation described above can be performed for each $P_{i+4}$ in the same manner. Specifically, this can be defined as follows:

$$(\alpha_{i,0}, \alpha_{i,1}, \alpha_{i,2}, \alpha_{i,3}, \alpha_{i,4}) = CR(i, \{vid_k\}^4_{k=0}, seed_{i+4}) \text{ for } i=0,1,2,3,4$$

$$\alpha_{i,k} = F_n(vid_k, seed_{i+4}) - F_n(vid_{k+1}, seed_{i+4}) \bmod n \text{ for } i=0,1,2,3,4$$

Below is a set of the pseudorandom numbers generated as described above.

TABLE 1

| $\alpha_{0,0}$ | $\alpha_{1,0}$ | $\alpha_{2,0}$ | $\alpha_{3,0}$ | $\alpha_{4,0}$ |
|---|---|---|---|---|
| $\alpha_{0,1}$ | $\alpha_{1,1}$ | $\alpha_{2,1}$ | $\alpha_{3,1}$ | $\alpha_{4,1}$ |
| $\alpha_{0,2}$ | $\alpha_{1,2}$ | $\alpha_{2,2}$ | $\alpha_{3,2}$ | $\alpha_{4,2}$ |
| $\alpha_{0,3}$ | $\alpha_{1,3}$ | $\alpha_{2,3}$ | $\alpha_{3,3}$ | $\alpha_{4,3}$ |
| $\alpha_{0,4}$ | $\alpha_{1,4}$ | $\alpha_{2,4}$ | $\alpha_{3,4}$ | $\alpha_{4,4}$ |

The pseudorandom number table above has a property that the sum with respect to the first index (vertical direction) is zero and the sum with respect to the second index (horizontal direction) is not zero.

Further, by appropriately sharing the five seeds ($seed_i \in \{0, 1\}^\kappa$ (i=0, 1, 2, 3, 4)), each secure computation server apparatus $200\_i$ is able to generate the pseudorandom number set. In other words, the secure computation server apparatuses $200\_i$ need not exchange each pseudorandom number $\alpha_{i,k}$ and therefore need not determine whether or not it is the correct value.

[Input]

The input step (the step S3) is a step for distributing inputs, to be securely computed, to each secure computation server apparatus $200\_i$ (i=0, 1, 2, 3, 4) and storing them therein. Here, we will assume that a party $P_i$ is an input dealer and shares [x] of $x \in Z_n$ are created. The process of the input step (the step S3) described below achieves Guaranteed Output Delivery (GOD) in the standard model by, for instance, providing the comparative verification part $201\_i$ in the secure computation server apparatus $200\_i$, as shown in FIG. 5, and having the comparative verification part $201\_i$ choose the correct value. Further, it is possible to realize the comparative verification part $201\_i$ as the program executed in the hardware configuration described later.

The party $P_i$ computes $r_i$, $r_{i+1}$, $r_{i+2}$, $r_{i+3}$ using a pseudorandom function as follows:

$$r_i = F_n(vid_i, seed_i)$$

Then, $P_i$ computes $x_4$ from $x \in Z_n$ using these $r_i$, $r_{i+1}$, $r_{i+2}$, $r_{i+3}$ as follows:

$$x_4 = x - r_i - r_{i+1} - r_{i+2} + r_{i+3} \bmod n$$

Then, the party $P_i$ lets his/her own share $[x]_i$ be $[x]_i = (x_{i+1}, x_{i+2}, x_{i+3}, x_{i+4}) = (r_{i+1}, r_{i+2}, r_{i+3}, r_{i+4})$. Meanwhile, the party $P_i$ sends $x_4$ to the other parties $P_{i+1}$, $P_{i+2}$, $P_{i+3}$, $P_{i+4}$.

Here, in order to simplify the description, we will notate the parties $P_{i+1}$, $P_{i+2}$, $P_{i+3}$, $P_{i+4}$ as $R_j$, $R_{j+1}$, $R_{j+2}$, $R_{j+3}$, where $R_{j+4} = R_j$ and $R_{j-4} = R_{j+3}$. Further, let $h_j$, $h_{j+1}$, $h_{j+2}$, $h_{j+3}$ be the hash values computed by $R_j$, $R_{j+1}$, $R_{j+2}$, $R_{j+3}$, respectively, for the received $x_{i+4}$, where $h_{i+4} = h_j$. Here, the reason for computing the hash values is to make communication efficient, and any hash function that does not assume the random oracle property and has collision resistance can be fully utilized.

Each $R_j$ (k=j, j+1, j+2, j+3) sends $x_{i+4}$ he/she received to $R_{k-1}$ as $m_k$. Further, each $R_j$ (k=j, j+1, j+2, j+3) sends $h_k$ to $R_{k-2}$ and $R_{k-3}$. Each $R_j$ compares his/her own $h_k$ with hash values $h_{k+1}$, $h_{k+2}$, and $h_{k+3}$ of the received $m_{k+1}$ and verifies whether three or more identical values are included. According to the result, one of the following processes is performed depending on the scenario.

(1) If only two or fewer identical values are included, $P_i$ is an adversary. Therefore, semi-honest secure four-party computation is executed with $P_i$ (and the initial inputs) excluded.

(2) If three or more identical values are included and $m_k$ is among them, $m_k$ is deemed to be the correct $x_{i+4}$.

(3) If three or more identical values are included and $m_k$ is not among them, $m_{k+1}$ is deemed to be the correct $x_{i+4}$.

Finally, each $R_j$ (k=j, j+1, j+2, j+3; j=i+1 mod 5) obtains a share $[x]_k$ as follows:

$$[x]_k = (x_k, x_{k+1}, x_{k+2}, x_{k+3}) \qquad \text{[Math. 2]}$$

$$x_k = \begin{cases} x_{i+4} (k = i + 4) \\ r_k \text{ (else)} \end{cases} \text{ where } r_k = F_n(vid_k, seed_k)$$

In the input method described above, by receiving the supposedly same (hash value of) $x_{i+4}$ from at least three other parties $P_j$ and accepting a value sent by at least three parties as the correct value, even if there is an adversary among the other parties $P_j$, the correct value can be determined. In other words, the correct computation can be obtained without interrupting the process even if there is an adversary, thereby achieving Guaranteed Output Delivery (GOD). Further, although a hash function is used in the above process, Guaranteed Output Delivery (GOD) is achieved in the standard model since security is not affected even if the input is inferred from the output.

[Secure Computation (Multiplication)]

The secure computation step (the step S4) is a step of performing desired computation on the shares distributed to and stored in each secure computation server apparatus $200\_i$ (i=0, 1, 2, 3, 4) while maintaining secrecy. The following describes multiplication, which is an important factor in secure computation, followed by other instances of secure computation such as addition and constant multiplication. The process of the secure computation step (the step S4) described below achieves Guaranteed Output Delivery (GOD) in the standard model by, for instance, providing the comparative verification part 201_i in the secure computation server apparatus 200_i, as shown in FIG. 5, and having the comparative verification part 201_i choose the correct value. Further, it is possible to realize the comparative verification part 201_i as the program executed in the hardware configuration described later.

Here, we will compute $[z]=[x\cdot y]=[x]\cdot[y]$ from two shares $[x]$, $[y]$. Further, we will assume that that x, y, and z are decomposed as follows.

$$z = \sum_{i=0}^{4} z_i \bmod n \qquad \text{[Math. 3]}$$

$$x = \sum_{i=0}^{4} x_i \bmod n$$

$$y = \sum_{i=0}^{4} y_i \bmod n$$

$$z_i = x_i \cdot \sum_{j=0}^{4} y_j \bmod n$$

A party $P_i$ (i=0, 1, 2, 3, 4) computes $tmp_{zk}$ as shown below. Since the party $P_i$ lacks $x_k \cdot y_{i+4}$ to compute $z_k$ (cannot compute it from his/her share), $P_i$ computes this $tmp_{zk}$ instead.

$$tmp_{z_k} = x_k \cdot (y_i + y_{i+1} + y_{i+2} + y_{i+3}) + \sum_{j\neq i} \alpha_{j,k} \bmod n \qquad \text{[Math. 4]}$$

$$(k = i, i+1, i+2, i+3)$$

Note that $\alpha_{j,\,k}$ is a pseudorandom number generated in the pseudorandom number computation step (the step S2) and is used here. Note that, in the first index (vertical direction), what appears to be random numbers to a party $P_i$ are listed. Meanwhile, the second index (horizontal direction) lists those used to compute $z_k$.

TABLE 2

|  | $P_0$ | $P_1$ | $P_2$ | $P_3$ | $P_4$ |
|---|---|---|---|---|---|
| $z_0$ | $\alpha_{0,\,0}$ | $\alpha_{1,\,0}$ | $\alpha_{2,\,0}$ | $\alpha_{3,\,0}$ | $\alpha_{4,\,0}$ |
| $z_1$ | $\alpha_{0,\,1}$ | $\alpha_{1,\,1}$ | $\alpha_{2,\,1}$ | $\alpha_{3,\,1}$ | $\alpha_{4,\,1}$ |
| $z_2$ | $\alpha_{0,\,2}$ | $\alpha_{1,\,2}$ | $\alpha_{2,\,2}$ | $\alpha_{3,\,2}$ | $\alpha_{4,\,2}$ |
| $z_3$ | $\alpha_{0,\,3}$ | $\alpha_{1,\,3}$ | $\alpha_{2,\,3}$ | $\alpha_{3,\,3}$ | $\alpha_{4,\,3}$ |
| $z_4$ | $\alpha_{0,\,4}$ | $\alpha_{1,\,4}$ | $\alpha_{2,\,4}$ | $\alpha_{3,\,4}$ | $\alpha_{4,\,4}$ |

Here, sender groups $S_i=\{P_{i+2}, P_{i+3}, P_{i+4}\}$, $S_{i+1}=\{P_{i+3}, P_{i+4}, P_{i+1}\}$, $S_{i+2}=\{P_{i+4}, P_{i+1}, P_{i+2}\}$, $S_{i+3}=\{P_{i+1}, P_{i+2}, P_{i+3}\}$ are defined. Then, the parties belonging to $S_k$ are able to compute $x_k y_{i+4}$ from their shares. Therefore, for instance, the parties $P_{i+2}$, $P_{i+3}$, $P_{i+4}$ belonging to the sender group $S_i=\{P_{i+2}, P_{i+3}, P_{i+4}\}$ compute $m_{k,\,i+2}$, $m_{k,\,i+3}$, $m_{k,\,i+4}$ where $x_k \cdot y_{i+4}$ is masked with the pseudorandom number $\alpha_{i,\,k}$ above:

$$P_{i+2} : m_{k,i+2} = \alpha_{i,k} + x_k \cdot y_{i+4} \bmod n$$

$$P_{i+3} : m_{k,i+3} = \alpha_{i,k} + x_k \cdot y_{i+4} \bmod n$$

$$P_{i+4} : m_{k,i+4} = \alpha_{i,k} + x_k \cdot y_{i+4} \bmod n$$

Then, of the parties $P_{i+2}$, $P_{i+3}$, $P_{i+4}$ belonging to the sender group $S_i=\{P_{i+2}, P_{i+3}, P_{i+4}\}$, for instance, the parties $P_{i+2}$, $P_{i+3}$ send $m_{k,\,i+2}$, $m_{k,\,i+3}$ as they are to the party $P_i$, and the party $P_{i+4}$ sends a hash value $h_{k,\,i+4}$ of $m_{k,\,i+4}$ to the party $P_i$. Here, since $m_{k,\,i+2}$, $m_{k,\,i+3}$, $m_{k,\,i+4}$ are masked with the pseudorandom number $\alpha_{i,\,k}$, $x_k y_{i+4}$ is not leaked. In other words, a hash function is used here to reduce the communication cost, not to ensure security. Further, the communication cost here is an amortized communication volume of a round and 2n [bits] to compute one $z_k$. This is quadrupled to 8n [bits] since each party has four $z_k$. Because there are five parties, this is further quintupled, totaling one round and 40n [bits].

Then, having received $m_{k,\,i+2}$, $m_{k,\,i+3}$, and the hash value $h_{k,\,i+4}$ of $m_{k,\,i+4}$, the party $P_i$ compares and verifies $m_{k,\,i+2}$, $m_{k,\,i+3}$, and the hash value $h_{k,\,i+4}$ of $m_{k,\,i+4}$. First, the party $P_i$ computes hash values $h_{k,\,i+2}$, $h_{k,\,i+3}$ of $m_{k,\,i+2}$, $m_{k,\,i+3}$. Then, $P_i$ deems $m_{k,\,i+2}$ to be $m_k$ if $h_{k,\,i+2}=h_{k,\,i+3}$ or $h_{k,\,i+2}=h_{k,\,i+4}$. Meanwhile, $P_i$ deems $m_{k,\,i+2}$ to be $m_k$ if $h_{k,\,i+3}=h_{k,\,i+4}$.

With $x_k y_{i+4}$ sent to the party $P_i$ as described above, even if there is an adversary among the other parties $P_j$, $P_i$ can determine the correct value by receiving the supposedly same (hash value of) $m_k$ from at least three other parties $P_j$ and accepting a value sent by at least two parties as the correct value.

Then, the party $P_i$ computes $z_k=tmp_{zk}+m_k \bmod n$ (k=i, i+1, i+2, i+3) using $m_k$ determined to be the correct value.

$$z_k = tmp_{z_k} + m_k \qquad \text{[Math. 5]}$$

$$= \left( x_k \cdot (y_i + y_{i+1} + y_{i+2} + y_{i+3}) + \sum_{j\neq i}\alpha_{j,k} \right) + (\alpha_{i,k} + x_k \cdot y_{i+4})$$

$$= x_k \cdot \sum_{j=0}^{4} y_j + \sum_{j=0}^{4}\alpha_{j,k}$$

$z_k$ computed in this way contains additional terms, which function as the shares $[z]_i=(z_i, z_{i+1}, z_{i+2}, z_{i+3})$ of the result of computing $[z]=[xy]=[x][y]$. This becomes clear when $z=z_0+z_1+z_2+z_3+z_4$ is actually computed as follows:

$$z = z_0 + z_1 + z_2 + z_3 + z_4 \qquad \text{[Math. 6]}$$

$$= \left( x_0 \cdot \sum_{j=0}^{4}y_j + \sum_{j=0}^{4}\alpha_{j,0} \right) + \left( x_1 \cdot \sum_{j=0}^{4}y_j + \sum_{j=0}^{4}\alpha_{j,1} \right) +$$

$$\left( x_2 \cdot \sum_{j=0}^{4}y_j + \sum_{j=0}^{4}\alpha_{j,2} \right) + \left( x_3 \cdot \sum_{j=0}^{4}y_j + \sum_{j=0}^{4}\alpha_{j,3} \right) +$$

$$\left( x_4 \cdot \sum_{j=0}^{4}y_j + \sum_{j=0}^{4}\alpha_{j,4} \right)$$

$$= (x_0 + x_1 + x_2 + x_3 + x_4) \cdot \sum_{j=0}^{4}y_j + \sum_{k=0}^{4}\alpha_{0,k} + \sum_{k=0}^{4}\alpha_{1,k} + \sum_{k=0}^{4}\alpha_{2,k} +$$

$$\sum_{k=0}^{4}\alpha_{3,k} + \sum_{k=0}^{4}\alpha_{4,k} = x \cdot y \bmod n$$

Here, the reason that the pseudorandom numbers $\alpha_{i,\,k}$ are removed is that the following relational expression holds due to the way the pseudorandom numbers are configured.

$$\sum_{k=0}^{4}\alpha_{0,k} = \sum_{k=0}^{4}\alpha_{1,k} = \sum_{k=0}^{4}\alpha_{2,k} = \sum_{k=0}^{4}\alpha_{3,k} = \sum_{k=0}^{4}\alpha_{4,k} = 0 \qquad \text{[Math. 7]}$$

As mentioned in the description of the pseudorandom number computation step (the step S2), the pseudorandom numbers in the present configuration have the property that the sum with respect to the first index (vertical direction) is zero and the sum with respect to the second index (horizontal direction) is not zero. The additional terms appearing in the computation result of $z_k=\mathrm{tmp}_{zk}+m_k \bmod n$ (k=i, i+1, i+2, i+3) are the sums with respect to the second index (horizontal direction), which are not zero, but it is ultimately possible to remove the effects of the additional terms (masks) using the property that the sum with respect to the first index (vertical direction) is zero when the result of computing $[z]=[x\cdot y]=[x]\cdot[y]$ is reconstructed. In other words, $z_k$ computed above contains additional terms, which function as the shares $[z]_i=(z_i, z_{i+1}, z_{i+2}, z_{i+3})$ of the result of computing $[z]=[x\cdot y]=[x]\cdot[y]$.

With respect to the shares $[z]_i=(z_i, z_{i+1}, z_{i+2}, z_{i+3})$ of the result of computing $[z]=[x\cdot y]=[x]\cdot[y]$ described above, by receiving the supposedly same (hash value of) $m_k$ from at least three other parties $P_j$ and accepting a value sent by at least two parties as the correct value, even if there is an adversary among the other parties $P_j$, the correct value can be determined. In other words, the correct computation can be obtained without interrupting the process even if there is an adversary among the parties, thereby achieving Guaranteed Output Delivery (GOD). Further, although a hash function is used in the above process, Guaranteed Output Delivery (GOD) is achieved in the standard model since security is not affected even if the input is inferred from the output.

[Secure Computation (Addition, Etc.)]

In the secure computation step (the step S4), it is also possible to perform types of secure computation other than multiplication, such as addition and constant multiplication. The following describes these instances of secure computation that are not multiplication.

(Constant Addition)

Let us assume a situation in which a constant $c \in Z_n$ is shared by all the parties $P_i$. In this case, constant addition $[x]+c=[x+c]$ can be performed by computing $[x+c]_i=(x'_i, x'_{i+1}, x'_{i+2}, x'_{i+3})$ using $[x]_i$ and c, where $x'_i=x_0+x \bmod n$ (i=0), $x'_i=x_i$ (i≠0).

(Constant Multiplication)

Let us assume another situation in which a constant $c \in Z_n$ is shared by all the parties $P_i$. In this case, constant multiplication $[x]\cdot c=[x\cdot c]$ can be performed by computing $[x\cdot c]_i=(x'_i, x'_{i+1}, x'_{i+2}, x'_{i+3})$ using $[x]_i$ and c, where $x'_i=c\cdot x_i \bmod n$.

(Addition of Shares)

Share addition $[x]+[y]=[z]$ can be performed by computing $[z]_i=(z_i, z_{i+1}, z_{i+2}, z_{i+3})$, where $z_i=x_i+y_i \bmod n$.

(Dot Product)

The dot product of vectors of shares is a simple extension of share multiplication, and $z_k$ can simply be sent all together since no local multiplication is necessary.

$$\left[\sum_{j=0}^{m-1} x^{(j)} \cdot y^{(j)}\right] \leftarrow DotProduct\left(\{[x^{(j)}]\}_{j=0}^{m-1}, \{[y^{(j)}]\}_{j=0}^{m-1}\right) \qquad \text{[Math. 8]}$$

[Reconstruction]

The reconstruction step (the step S5) is a step of reconstructing the shares resulting from the secure computation step (the step S4). The reconstruction step (the step S5) is essentially the same as the process in the first example embodiment, but the following describes a process incorporating a hash function. The process of the reconstruction step (the step S5) described below achieves Guaranteed Output Delivery (GOD) in the standard model by, for instance, providing the comparative verification part $201\_i$ in the secure computation server apparatus $200\_i$, as shown in FIG. 5, and having the comparative verification part $201\_i$ choose the correct value. Further, it is possible to realize the comparative verification part $201\_i$ as the program executed in the hardware configuration described later.

Let us look at a case where a party $P_i$ receives the share value $x_{i+4}$, which $P_i$ does not have, from the other parties $P_{i+1}, P_{i+2}, P_{i+3}$ in order to reconstruct x. The parties $P_{i+1}, P_{i+2}$ send the value $x_{i+4}$ as is to the party $P_i$, and the party $P_{i+3}$ sends the hash value $h_{i+4}$ of the value $x_{i+4}$ to the party $P_i$. Then, the party $P_i$ computes a hash value of $x_{i+4}$ received from the parties $P_{i+1}, P_{i+2}$ as $h_{i+1}$ and a hash value of $x_{i+4}$ received from the party $P_{i+2}$ as $h_{i+2}$.

At this time, if $h_{i+1}=h_{i+2}$ or $h_{i+1}=h_{i+3}$, then $P_i$ accepts $x_{i+4}$ received from the party $P_{i+1}$ as the correct value. Further, if $h_{i+2}=h_{i+3}$, then $P_i$ accepts $x_{i+4}$ received from the party $P_{i+2}$ as the correct value. As described, even if one of the received values is false, the correct value can be determined by accepting as the correct value a received value identical to at least another received value. Then, it is possible to reconstruct x by calculating $x=x_0+x_1+x_2+x_3+x_4 \bmod n$ using the correct value $x_{i+4}$.

In the reconstruction method described above, by receiving the supposedly same (hash value of) $x_{i+4}$ from at least three other parties $P_j$ and accepting a value sent by at least two parties as the correct value, even if there is an adversary among the other parties $P_j$, the correct value is determined. In other words, the correct computation can be obtained without interrupting the process even if there is an adversary, thereby achieving Guaranteed Output Delivery (GOD). Further, although a hash function is used in the above process, Guaranteed Output Delivery (GOD) is achieved in the standard model since security is not affected even if the input is inferred from the output.

The typical steps of secure computation shown in FIG. 4 have been described, and as stated above, across all the steps, the correct computation can be obtained without interrupting the process even if there is an adversary, thereby achieving Guaranteed Output Delivery (GOD).

[Hardware Configuration]

Figure 6:
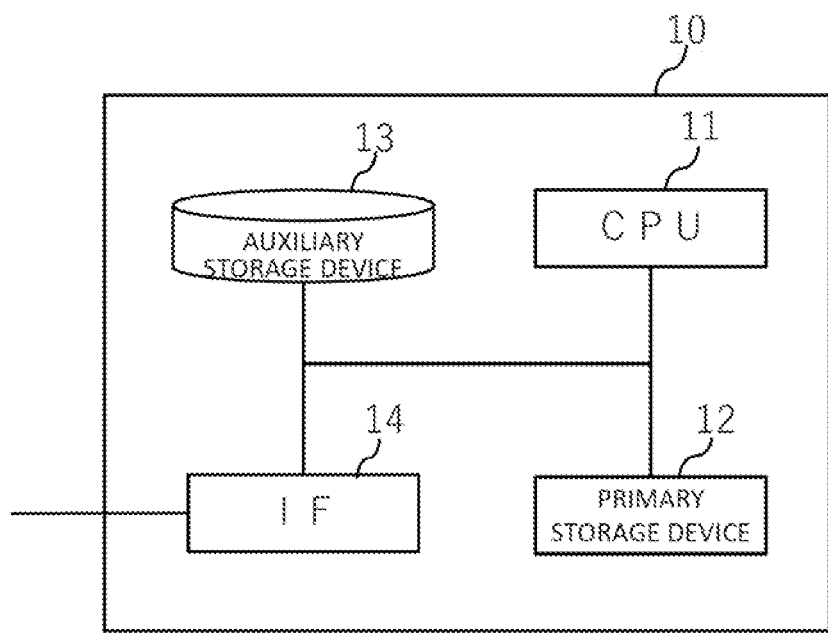
FIG. 6 is a drawing showing an example of the hardware configuration of the secure computation server apparatus.

FIG. 6 is a drawing illustrating an example of the hardware configuration of the secure computation server apparatus. In other words, FIG. 6 shows an example of the hardware configuration of the secure computation server apparatuses $100\_i$ and $200\_i$ (i=0, 1, 2, 3, 4). An information processing apparatus (computer) employing the hardware configuration shown in FIG. 6 can achieve the functions of the secure computation server apparatuses $100\_i$ and $200\_i$ (i=0, 1, 2, 3, 4) by executing the secure computation method described above as a program.

It should be noted that the hardware configuration example shown in FIG. 6 is merely an example of the hardware configuration that achieves the functions of the secure computation server apparatuses $100\_i$ and $200\_i$ (i=0, 1, 2, 3, 4), and is not intended to limit the hardware configuration of the secure computation server apparatuses $100\_i$ and $200\_i$ (i=0, 1, 2, 3, 4). The secure computation server apparatuses $100\_i$ and $200\_i$ (i=0, 1, 2, 3, 4) may include hardware not shown in FIG. 6.

As shown in FIG. 6, the hardware configuration 10 that may be employed by the secure computation server apparatuses $100\_i$ and $200\_i$ (i=0, 1, 2, 3, 4) comprises a CPU (Central Processing Unit) 11, a primary storage device 12, an auxiliary storage device 13, and an IF (interface) part 14. These elements are connected to each other by, for instance, an internal bus.

The CPU 11 executes each instruction included in the secure computation program executed by the secure computation server apparatuses 100_i and 200_i (i=0, 1, 2, 3, 4). The primary storage device 12 is, for instance, a RAM (Random Access Memory) and temporarily stores various programs such as the secure computation program executed by the secure computation server apparatuses 100_i and 200_i (i=0, 1, 2, 3, 4) so that the CPU 11 can process the programs.

The auxiliary storage device 13 is, for instance, an HDD (Hard Disk Drive) and is capable of storing the various programs, such as the secure computation program executed by the secure computation server apparatuses 100_i and 200_i (i=0, 1, 2, 3, 4), in the medium to long term. The various programs such as the secure computation program may be provided as a program product stored in a non-transitory computer-readable storage medium. The auxiliary storage device 13 can be used to store the various programs such as the secure computation program stored in the non-transitory computer-readable storage medium in the medium to long term. The IF part 14 provides an interface to the input and output between the secure computation server apparatuses 100_i and 200_i (i=0, 1, 2, 3, 4).

The information processing apparatus employing the hardware configuration 10 described above can achieve the functions of the secure computation server apparatuses 100_i and 200_i (i=0, 1, 2, 3, 4) by executing the secure computation method described above as a program.

Some or all of the example embodiments above can be described as (but not limited to) the following Supplementary Notes.

Supplementary Note 1

A secure computation system comprising at least five secure computation server apparatuses connected to each other via a network and performing secure computation on a value stored while being secret-shared, wherein
each of the secure computation server apparatuses comprises:
a comparative verification part that compares values, which should be the same, received from at least three secure computation server apparatuses and accepts a received value identical to at least another received value as a correct value.

Supplementary Note 2

The secure computation system according to Supplementary Note 1, wherein
each of the secure computation server apparatuses further comprises:
a pseudorandom function computation part that deterministically generates a pseudorandom number using a seed and an identifier as inputs and makes a set of masks that sum to zero with respect to a first index and sum to a nonzero value with respect to a second index by using the pseudorandom numbers, and
wherein the received value is sent while being kept in secret with the mask.

Supplementary Note 3

The secure computation system according to Supplementary Note 2, wherein a share value of multiplication of two share values secret-shared by each of the secure computation server apparatuses includes the sum with respect to the second index as an additional term, and removing the mask using the fact that the sum with respect to the first index is zero when reconstructing the result of the multiplication.

Supplementary Note 4

The secure computation system according to any one of Supplementary Notes 1 to 3, wherein the comparative verification part determines that the received values are correct by verifying that hash values of the received values are the same.

Supplementary Note 5

A secure computation server apparatus out of at least five secure computation server apparatuses, connected to each other via a network, for performing secure computation on a value stored while being secret-shared, the secure computation server apparatus comprising:
a comparative verification part that compares values, which should be the same, received from at least three secure computation server apparatuses and accepts a received value identical to at least another received value as a correct value.

Supplementary Note 6

A secure computation method comprising at least five secure computation server apparatuses connected to each other via a network and performing secure computation on a value stored while being secret-shared, wherein
each of the secure computation server apparatuses compares values, which should be the same, received from at least three secure computation server apparatuses and accepts a received value identical to at least another received value as a correct value.

Supplementary Note 7

The secure computation method according to Supplementary Note 6 deterministically generating a pseudorandom number using a seed and an identifier as inputs, making a set of masks that sum to zero with respect to a first index and sum to a nonzero value with respect to a second index by using the pseudorandom numbers, and sending the received value being kept in secret with the mask.

Supplementary Note 8

The secure computation method according to Supplementary Note 7, wherein a share value of multiplication of two share values secret-shared by each of the secure computation server apparatuses includes the sum with respect to the second index as an additional term, and removing the mask using the fact that the sum with respect to the first index is zero when reconstructing the result of the multiplication.

Supplementary Note 9

The secure computation method according to any one of Supplementary Notes 6 to 8 determining that the received values are correct by verifying that hash values of the received values are the same.

Supplementary Note 10

A secure computation program causing at least five secure computation server apparatuses connected to each other via a network to perform secure computation on a value stored while being secret-shared, the secure computation program including:

a process of comparing values, which should be the same, received from at least three secure computation server apparatuses and accepting a received value identical to at least another received value as a correct value.

Further, the disclosure of Non-Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object of the present invention shall be considered to be included in the disclosed matters of the present application.

REFERENCE SIGNS LIST

100, 200: secure computation system
100_i, 200_i: secure computation server apparatus
101_i, 201_i: comparative verification part
202_i: pseudorandom function computation part
10: hardware configuration
11: CPU (Central Processing Unit)
12: primary storage device
13: auxiliary storage device
14: IF (interface) part
What is claimed is:

1. A secure computation system comprising at least five secure computation server apparatuses connected to each other via a network and performing secure computation on a value stored while being secret-shared, wherein each of the secure computation server apparatuses comprises:
at least a processor; and
a memory in circuit communication with the processor,
wherein the processor is configured to execute program instructions stored in the memory to implement:
a comparative verification part that compares values, which should be the same, received from at least three secure computation server apparatuses and accepts a received value identical to at least another received value as a correct value,
a pseudorandom function computation part that deterministically generates pseudorandom numbers using a seed and an identifier as inputs and makes a set of masks that sum to zero with respect to a first index and sum to a nonzero value with respect to a second index by using the pseudorandom numbers, and wherein the received value is sent while being kept in secret with the masks.

2. The secure computation system according to claim 1, wherein a share value of multiplication of two share values secret-shared by each of the secure computation server apparatuses includes the sum with respect to the second index as an additional term, and removing the masks using the fact that the sum with respect to the first index is zero when reconstructing the result of the multiplication.

3. The secure computation system according to claim 1, wherein the comparative verification part determines that the received values are correct by verifying that hash values of the received values are the same.

4. A secure computation server apparatus out of at least five secure computation server apparatuses, connected to each other via a network, for performing secure computation on a value stored while being secret-shared, the secure computation server apparatus comprising:
at least a processor; and
a memory in circuit communication with the processor,
wherein the processor is configured to execute program instructions stored in the memory to implement:
a comparative verification part that compares values, which should be the same, received from at least three secure computation server apparatuses and accepts a received value identical to at least another received value as a correct value,
a pseudorandom function computation part that deterministically generates pseudorandom numbers using a seed and an identifier as inputs and makes a set of masks that sum to zero with respect to a first index and sum to a nonzero value with respect to a second index by using the pseudorandom numbers, and
wherein the received value is sent while being kept in secret with the masks.

5. The secure computation server apparatus according to claim 4, wherein a share value of multiplication of two share values secret-shared by each of the secure computation server apparatuses includes the sum with respect to the second index as an additional term, and removing the masks using the fact that the sum with respect to the first index is zero when reconstructing the result of the multiplication.

6. The secure computation server apparatus according to claim 4, wherein the comparative verification part determines that the received values are correct by verifying that hash values of the received values are the same.

7. A secure computation method comprising at least five secure computation server apparatuses connected to each other via a network and performing secure computation on a value stored while being secret-shared, wherein each of the secure computation server apparatuses deterministically generates pseudorandom numbers using a seed and an identifier as inputs, makes a set of masks that sum to zero with respect to a first index and sum to a nonzero value with respect to a second index by using the pseudorandom numbers, sends a received value being kept in secret with the masks and compares values, which should be the same, received from at least three secure computation server apparatuses and accepts a received value identical to at least another received value as a correct value.

8. The secure computation method according to claim 7, wherein a share value of multiplication of two share values secret-shared by each of the secure computation server apparatuses includes the sum with respect to the second index as an additional term, and removing the masks using the fact that the sum with respect to the first index is zero when reconstructing the result of the multiplication.

9. The secure computation method according to claim 7 determining that the received values are correct by verifying that hash values of the received values are the same.

10. A non-transitory computer readable medium storing a secure computation program causing at least five secure computation server apparatuses connected to each other via a network to perform secure computation on a value stored while being secret-shared, the secure computation program including:

a process of comparing values, which should be the same, received from at least three secure computation server apparatuses and accepting a received value identical to at least another received value as a correct value, a process of deterministically generating pseudorandom numbers using a seed and an identifier as inputs, making a set of masks that sum to zero with respect to a first index and sum to a nonzero value with respect to a second index by using the pseudorandom numbers, and a process of sending the received value being kept in secret with the masks.

11. The non-transitory computer readable medium storing a secure computation program according to claim 10, wherein a share value of multiplication of two share values secret-shared by each of the secure computation server apparatuses includes the sum with respect to the second index as an additional term, and including:

a process of removing the masks using the fact that the sum with respect to the first index is zero when reconstructing the result of the multiplication.

12. The non-transitory computer readable medium storing a secure computation program according to claim 10, including:

a process of determining that the received values are correct by verifying that hash values of the received values are the same.

\* \* \* \* \*